(12) United States Patent
Achten et al.

(10) Patent No.: US 12,305,021 B2
(45) Date of Patent: May 20, 2025

(54) 3D-PRINTED ELASTIC PRODUCTS REINFORCED BY MEANS OF CONTINUOUS FIBRES AND HAVING ASYMMETRICAL ELASTIC PROPERTIES

(71) Applicant: STRATASYS, INC., Eden Prairie, MN (US)

(72) Inventors: Dirk Achten, Leverkusen (DE); Nicolas Degiorgio, Krefeld (DE); Jonas Kuenzel, Leverkusen (DE); Thomas Buesgen, Leverkusen (DE)

(73) Assignee: STRATASYS, INC., Eden Prairie, MN (US)

( * ) Notice: Subject to any disclaimer, the term of this patent is extended or adjusted under 35 U.S.C. 154(b) by 928 days.

(21) Appl. No.: 17/273,343

(22) PCT Filed: Sep. 10, 2019

(86) PCT No.: PCT/EP2019/074030
§ 371 (c)(1),
(2) Date: Mar. 4, 2021

(87) PCT Pub. No.: WO2020/053168
PCT Pub. Date: Mar. 19, 2020

(65) Prior Publication Data
US 2021/0324177 A1    Oct. 21, 2021

(30) Foreign Application Priority Data
Sep. 14, 2018  (EP) ..................................... 18194177

(51) Int. Cl.
*C08K 7/14*    (2006.01)
*B29C 64/118*    (2017.01)
(Continued)

(52) U.S. Cl.
CPC ................ *C08K 7/14* (2013.01); *B33Y 80/00* (2014.12); *C08L 21/00* (2013.01); *C08L 75/04* (2013.01); *B29C 64/118* (2017.08); *B33Y 10/00* (2014.12)

(58) Field of Classification Search
CPC ........................................................ C08K 7/14
See application file for complete search history.

(56) References Cited

U.S. PATENT DOCUMENTS

| 4,946,535 A | 8/1990 | Meckel et al. |
| 9,688,028 B2 | 6/2017 | Mark et al. |

(Continued)

FOREIGN PATENT DOCUMENTS

| CN | 106313496 A | 1/2017 |
| DE | 2901774 A1 | 7/1980 |

(Continued)

OTHER PUBLICATIONS

International Search Report, PCT/EP2019/074030, date of mailing: Nov. 21, 2019, Authorized officer: Benoit Gasner.

(Continued)

*Primary Examiner* — Michael F Pepitone
(74) *Attorney, Agent, or Firm* — Faegre Drinker Biddle & Reath LLP

(57) ABSTRACT

The present invention relates to a fibre-reinforced 3D-printed elastic product (1, 3, 4, 7, 10, 12), wherein the product comprises a weight proportion of ≥50% of a polymer having a mean molecular weight of ≥5000 g/mol, measured by means of GPC, and a weight proportion of ≥0.5% and ≤20% of one or more fibres having an aspect ratio of ≥100 and a length of ≥3 cm and ≤1000 cm, the product being produced at least in part by means of an FFF (Fused Filament Fabrication) method, and the product having a tensile modulus of ≥1.5 GPa in the region of the fibre (Continued)

reinforcement and in the direction of the fibre symmetry axis. The product also has a tensile modulus, measured according to DIN EN ISO 527-1, of ≤1.2 GPa in the region of the fibre reinforcement and perpendicular to the fibre symmetry axis, and has a yield strength of >5%, measured according to DIN EN ISO 527-1, perpendicular to the fibre symmetry axis.

15 Claims, 4 Drawing Sheets

(51) Int. Cl.
  *B33Y 10/00* (2015.01)
  *B33Y 80/00* (2015.01)
  *C08L 21/00* (2006.01)
  *C08L 75/04* (2006.01)

(56) References Cited

U.S. PATENT DOCUMENTS

| | | |
|---|---|---|
| 10,370,510 B2 | 8/2019 | Cernohous et al. |
| 2016/0012935 A1 | 1/2016 | Rothfuss |
| 2016/0067928 A1 | 3/2016 | Mark et al. |
| 2016/0159007 A1 | 6/2016 | Miller, IV et al. |
| 2016/0303779 A1* | 10/2016 | Kunc ............... B29C 64/165 |
| 2016/0346997 A1 | 12/2016 | Lewis et al. |
| 2017/0137585 A1* | 5/2017 | Heikkila ............. C08K 7/02 |
| 2017/0210074 A1 | 7/2017 | Ueda et al. |
| 2018/0001547 A1 | 1/2018 | Cuypers et al. |
| 2018/0072040 A1 | 3/2018 | Mark et al. |
| 2018/0131124 A1 | 5/2018 | Matlack et al. |
| 2018/0244906 A1 | 8/2018 | Feng et al. |
| 2019/0275720 A1 | 9/2019 | Pourdeyhimi et al. |

FOREIGN PATENT DOCUMENTS

| | | |
|---|---|---|
| EP | 0192946 A1 | 9/1986 |
| EP | 3150361 A1 | 4/2017 |
| WO | 2015054021 | 4/2015 |
| WO | 2017/127443 A1 | 7/2017 |

OTHER PUBLICATIONS

International Search Report and Written Opinion received for PCT Patent Application No. PCT/EP2019/074030, mailed on Nov. 21, 2019, 20 pages (9 pages of English Translation and 11 pages of Original Document).

* cited by examiner

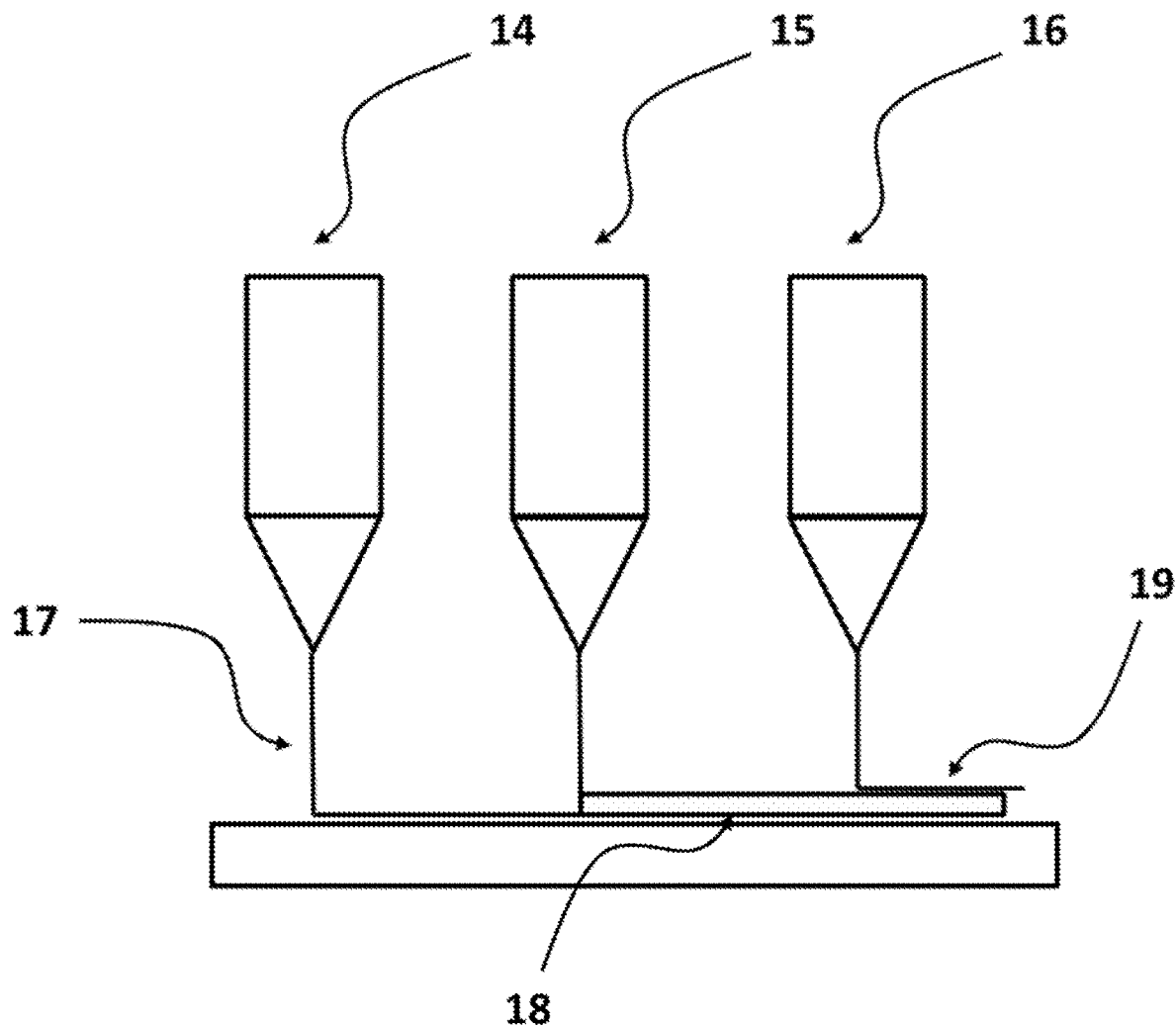

3D-PRINTED ELASTIC PRODUCTS REINFORCED BY MEANS OF CONTINUOUS FIBRES AND HAVING ASYMMETRICAL ELASTIC PROPERTIES

CROSS-REFERENCE TO RELATED APPLICATION

This application is a national stage application under 35 U.S.C. § 371 of PCT/EP2019/074030, filed Sep. 10, 2019, which claims the benefit of European Application No. 18194177.4, filed Sep. 14, 2018, each of which is incorporated herein by reference.

FIELD

The present invention relates to a fiber-reinforced, 3D-printed elastic product, wherein the product comprises a proportion by weight of ≥50% of a polymer having an average molecular weight of ≥5000 g/mol, measured by means of GPC, and a proportion by weight of ≥0.5% and ≤20% of one or more fibers having an aspect ratio of ≥100 and a length of ≥3 cm and ≤1000 cm, wherein the product is at least partially produced by means of a FFF (Fused Filament Fabrication) method and the product, in the region of the fiber reinforcement and in the direction of the fiber symmetry axis, has a tensile modulus of ≥1.5 GPa.

BACKGROUND

The properties of products result in a complex manner from the production process and the materials used. For instance, the properties of the finished workpiece can as a rule be modified in a controlled manner both as a function of the parameters in the production route and via the composition of the base materials used, so that (ideally) end products having completely different properties can be obtained via the complex matrix resulting from both influencing variables. This fundamental relationship generally arises for all production processes and can be broken down into the individual active components by collecting experience in production. In the context of modern manufacturing processes which are based on a plurality of stages or parallel process steps, these cause-effect relationships can be more difficult to determine, as it is not possible to draw on many years of production experience. This applies for example to the production of products by 3D printing, a production method which is relatively new compared to other methods for producing shaped bodies, where here too the properties of the shaped bodies produced arise in a complex manner from the interplay between production process and material used. The complexity can be additionally increased in the case of 3D printing as a result of using, in addition to the "simple" printing of a base material, more complex mixtures and/or different materials with different properties and difficult-to-predict interactions with each other. This can result in product properties which cannot be extrapolated from the properties of the materials used.

3D-printed products having fiber reinforcement and the production of same are described in the prior art.

For example, U.S. Pat. No. 9,688,028 B2 discloses a method for producing anisotropically filled 3D-printed bodies. The method involves receiving a three-dimensional geometry and cutting it into layers. A first anisotropic fill tool path for controlling a three-dimensional printer for depositing an essentially anisotropic fill material is generated and defines at least a portion of an interior of a first layer. A second anisotropic fill tool path for controlling a three-dimensional printer is generated in order to deposit the essentially anisotropic fill material which defines at least a portion of an interior of a second layer. A generated isotropic fill material tool path defines at least a portion of a perimeter and at least a portion of an interior of a third layer lying between the first and the second layer.

US 2016/0067928 A1 describes a method for producing anisotropically filled 3D-printed bodies by means of FDM processes involving the deposition of at least one isotropic and at least one anisotropic material. The document describes receiving a three-dimensional geometry and cutting it into layers. A first anisotropic fill tool path for controlling a three-dimensional printer for depositing an essentially anisotropic fill material is generated and defines at least a portion of an interior of a first layer. A second anisotropic fill tool path for controlling a three-dimensional printer in order to deposit the essentially anisotropic fill material defines at least a portion of an interior of a second layer. A generated isotropic fill material tool path defines at least a portion of a perimeter and at least a portion of an interior of a third layer lying between the first and the second layer.

Another patent document, US 2018/0072040 A1, describes the 3D printing of long-fiber-reinforced thermoplastics in an FDM process for producing fiber-reinforced components. The method comprises receiving a first 3D tool path defining a curved fill material shell, receiving first 2D tool paths defining flat support shells, receiving a second 3D tool path defining a curved shell of long fiber composite material, the long fiber composite material including a filament having a matrix; embedding fibers having a length longer than two times a diameter of the filament, actuating a fill material deposition head to trace the first 3D tool path to deposit the fill material curved shell non-parallel to a printing substrate, actuating a support material deposition head to track the first 2D tool paths to deposit support material in a succession of substantially flat shells and to actuate a long fiber deposition head to trace the second 3D tool path non-parallel to the printing substrate to deposit the curved shell composed of long fiber composite material, at least a portion of the fill material enclosing the curved shell.

CN 106 313 496 A also describes a method for processing continuous fibers together with thermoplastics in a special FDM process. The document discloses a 3D printing method for a continuous-fiber-reinforced thermoplastic resin matrix composite material and a printhead. According to the method, fiber bundles and molten thermoplastic resins can be subjected to rotary blending and then subjected to rotary extrusion, the extruded threads being helical; and the printhead can charge the fiber bundles and the thermoplastic resins in a melt cavity, and helical toothed rings are arranged on the inner sides of the melt cavity and of an extrusion head and rotate in opposite directions. The heated molten resins and fibers are agitated by the helical toothed rings, which rotate in two directions after the blending, so that the fibers are compactly wound from a flat form into a helical columnar form, the resins are distributed uniformly in each fiber orientation, and then a blend is extruded from an extrusion opening into a forming area, cooled and hardened, in order to form a three-dimensional unit. According to the method and the printhead, the flat large-tow fibers can be used as reinforcements in a 3D printing method, wherein the compactly wound fibers exhibit a high degree of compaction, the fibers and the matrices are sufficiently impregnated, and the formed fibers and resins are uniformly distributed; the method and the printhead are therefore able to improve the mechanical properties of an element and the forming quality.

WO 2015/120429 A1 describes a method for processing continuous fibers by extrusion of a thixotropic post-cross-linkable liquid containing fillers in addition to the fibers. The document describes a filament structure which is extruded from a nozzle during the 3D printing and comprises a continuous filament with filler particles dispersed therein. At least some of the filler particles in the continuous filament comprise high aspect ratio particles which have a predetermined orientation with respect to a longitudinal axis of the continuous filament. The high aspect ratio particles may be aligned at least partially along the longitudinal axis of the continuous filament. In some embodiments, the high aspect ratio particles can be highly aligned along the longitudinal axis. In addition or as an alternative, at least some of the high aspect ratio particles can have a helical alignment comprising a circumferential component and a longitudinal component, the circumferential component being produced by rotation of a deposition nozzle and the longitudinal component being imparted by translation of the deposition nozzle.

WO 2018/081554 A1, in contrast, describes a process for producing continuous-fiber-reinforced components for use as implant materials. The document describes methods and apparatuses for printing a three-dimensional fiber structure. A fiber layer is printed onto a print surface by pressing fibers through at least one extrusion nozzle and onto the print surface. The extrusion nozzle and/or print surface are moved in the X, Y and/or Z direction during printing of the fibers. The method can be used to produce medical bandages, hernia meshes, vascular implants, knee menisci or rotator cuffs.

US 2018/0131124 A1 describes a method for producing 3D-printed seals containing inter alia reinforcing fillers. The document discloses an electrical connector assembly for electric submersible pumps (ESPs) having a fluid impenetrable 3D-printed seal between the power cable and an internal housing component of the electrical connector assembly. Electrical insulation or dielectric for a conductor of the power cable may also be 3D-printed integrally with the fluid seal. The housing component, such as an internal electrical housing, may also be 3D-printed integrally with the printed seal. Likewise, in an implementation, the 3D-printed seal, the internal housing component, and an outer pothead case may all be printed as a unit onto the power cable. The 3D-printed seal and associated pothead components may be composed of a variety of chemical-resistant materials, such as printed polyaryletherketones, printed fluorinated polymers, and metal alloys. The 3D-printed seal may also include barrier materials or reinforcement fillers to enhance strength and chemical resistance to well fluids and gases.

US 2016/0159007 A1 describes a method for producing conveyor belts for the paper industry, with at least one part being 3D printed. The document discloses a papermaking belt including zones of material laid down successively using a 3D printing process. The zones include at least a pocket zone configured to form three-dimensional structures in a paper web by applying vacuum to pull the paper web against the pocket zone. In at least one exemplary embodiment, the zones also include at least one vacuum breaking zone configured to limit an amount of paper fibers pulled through the pocket zone by the applied vacuum.

US 2016/012935 A1 discloses a feedstock for additive manufacturing methods including a matrix material and one or more barbed fibers disposed within the matrix material. Each barbed fiber includes a central filament and one or more barbed structures. The barbed structures are configured to extend outwardly from the central filament after extrusion. Methods of making the feedstock and methods of using the feedstock to form three-dimensional objects are also disclosed.

US 2018/001547 A1 relates to a method for manufacturing an individualized immobilization element for the non-invasive immobilization and/or mobilization of at least a segment of a part of a patient's body in a predetermined position relative to a reference and/or in a predetermined configuration. The method comprises the steps of (i) providing a data set that comprises a three-dimensional image of an outer contour of at least a part of the body segment to be immobilized and/or mobilized and (ii) manufacturing at least a part of the immobilization element by rapid manufacturing of a shape on the basis of the data set using a polymeric material comprising a thermoplastic polymer having a melting point ≤100° C., wherein the polymeric material contains a nucleating agent for enhancing the crystallization of the thermoplastic polymer.

The prior art discloses the production of complex workpieces using 3D processes. However, the prior art does not disclose production of printed products with elastic behavior and highly asymmetrical mechanical properties.

SUMMARY

It is therefore the object of the present invention to provide complex, 3D-printed, fiber-reinforced elastic products which exhibit anisotropic, and preferably very highly anisotropic, mechanical properties.

A 3D-printed product according to claim 1 is therefore proposed. Advantageous developments are specified in the dependent claims. They may be combined as desired unless the opposite is clear from the context.

BRIEF DESCRIPTION OF THE DRAWINGS

Various features and characteristics of the inventions described in this specification may be better understood by reference to the accompanying figures, in which:

FIG. 7 shows a possible configuration for the deposition in accordance with the invention of a fiber in the method according to the invention.

DETAILED DESCRIPTION

Figure 1:
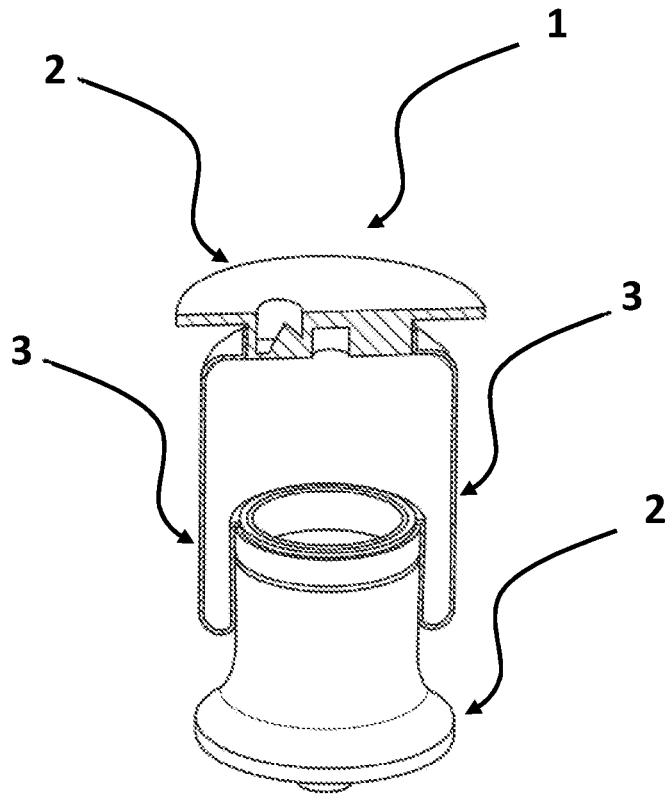
FIG. 1 shows a possible product in the context of the invention. An air spring produced via 3D printing according to the invention is illustrated in a top view.

The invention provides a fiber-reinforced, 3D-printed elastic product, wherein the product comprises a proportion by weight of ≥50% of a polymer having an average molecular weight (MO of ≥5000 g/mol, measured by means of GPC, and a proportion by weight of ≥0.5% and ≤20% of one or more fibers having an aspect ratio of ≥100 and a length of ≥3 cm and ≤1000 cm, wherein the product is at least partially produced by means of a FFF (Free Filament Fabrication) process and the product, in the region of the fiber reinforcement and in the direction of the fiber symmetry axis, has a tensile modulus measured according to DIN EN ISO 527-1 of ≥1.5 GPa.

According to the invention, the symmetry axis of a fiber is parallel to the longitudinal axis of the fiber, that is to say parallel to the fiber axis having the greatest spatial fiber extent. This is described in more detail hereinafter.

The products according to the invention have a plurality of advantages over the printed products described in the prior art. Based on the combination of the chemical properties of the base material and based on the production by means of 3D printing and additional fiber reinforcement, complex mechanical properties of the product result. The printed products are elastic in principle, and they have an extraordinarily high strength and stiffness in the direction of the symmetry axis of the fibers incorporated by printing. Perpendicular to these later loading directions, the product has an extraordinarily high elasticity, that is to say low stiffness and/or lower strength. There is also a high reversible deformability in this direction, which is of great importance for the repeated loading of the product without fracture or fatigue. On the basis of this combination, the product thus displays an extraordinarily high anisotropy in the mechanical properties, which enables successful use of these products in entirely new areas of application. The high anisotropy in the mechanical properties can manifest itself, for example, through clearly distinct mechanical parameters such as modulus anisotropy, damping anisotropy, and tensile stress at yield anisotropy. Here, the term "anisotropy" means that these mechanical values for characterizing the product are not identical but instead markedly different as a function of the measurement direction. In contrast, the prior art discloses either elastic or durable printed products having a more or less isotropic load-bearing capacity and/or material stiffening. This can be disadvantageous in many areas of application. Without being bound by theory, the high mechanical durabilities in the fiber direction in particular may result from the use of elastic base polymers in the claimed molecular weight range and from the specific dimensions of the incorporated fibers.

The product according to the invention is a fiber-reinforced, 3D-printed elastic product. A 3D-printed product has been at least partially produced via a 3D printing process. This may involve the entire product or only a partial region thereof having been produced via 3D printing. At least one of the sections printed by 3D printing also has, in addition to the printed elastic polymer, fibers within the printed polymer matrix. That is to say, this or these sections are fiber reinforced in the sense that within these sections of the product there is not just a 3D-printed polymer but rather a 3D-printed polymer with at least one integrated fiber having the dimensions and properties according to the invention. For the purposes of the present invention, a product is elastic if its elongation at break in the tensile test in accordance with DIN 53504 is ≥50%. The product can for example have a compression set after 10% compression (according to DIN ISO 815-1) of ≤50%, preferably <30%, particularly preferably <15%.

The product consists to a proportion by weight of ≥50% of a polymer. The proportions of polymers in relation to the other product contents can be decisive for the elastic properties of the product. However, by means of the method disclosed here, products are also obtainable which can have a "high filler level", that is to say that in addition to the polymer and the fibers they can also comprise significant proportions of other fillers. These products with a high filler level are also encompassed by the invention. In the context of the invention, polymers are macromolecules which are constructed from repeating, identical units. Examples of usable polymers or polymer mixtures are listed hereinafter. The determination of content is known to the person skilled in the art in this case and for uncrosslinked soluble polymers can be effected after dissolution of the product for example by means of gel permeation chromatography (GPC). For partially insoluble polymers by means of thermogravimetry (TGA) after selective thermal decomposition in order to distinguish the polymers from, for example, higher-decomposing inorganic fillers. In addition to this, elemental analyses can be carried out in order to quantify the organic constituents in comparison to inorganic constituents. Further test methods to be used for determining the proportions by weight are known to the person skilled in the art. For many applications, polymer contents of >55%, preferably >60%, further preferably >65%, and >70%, have proven advantageous for obtaining preferred elastic product properties.

The polymer has an average molecular weight ($M_n$) of ≥5000 g/mol, measured by means of GPC. The average molecular weight is understood to be the number-average molecular weight. The polymer used can have a mass distribution, the quotient of the total mass and the number of particles having to be greater than the value given above. The distribution and the average of the distribution can be determined on the finished product by means of GPC. For this purpose the product is expediently dissolved and subjected to GPC. Depending on the polymer used, the suitable GPC conditions including the solvents usable for the dissolution are known to the person skilled in the art. The polymer can also preferably have an average molecular weight of 10 000 g/mol, more preferably of >12 000 g/mol, and likewise preferably of >15 000 g/mol and particularly preferably of >20 000 g/mol. In the case of partially insoluble and partially crosslinked polymers (for example in the form of a polymerized organic filler or specks in a thermoplastic matrix), the molecular weight of the soluble matrix which can be processed by extrusion is defined as decisive, since at least partially crosslinked proportions can be assumed to have an "infinite" molecular weight by definition. These molar masses can lead to sufficient elastic properties of the printed polymer. Very high average molecular weights of for example >5 000 000 g/mol are disadvantageous on the other hand because they can be extruded only with difficulty in the field of 3D printing. Low molecular weights can be disadvantageous since these possess only inadequate elastic properties. The GPC analysis can be carried out for example in DMF at 23° C. and/or 80° C. on a polystyrene/divinylbenzene column material against PMMA as standard.

The product comprises a proportion by weight of ≥0.5% and ≤20% of one or more fibers. Within the context of the invention, "fibers" are understood here to mean linear structures consisting of a fibrous material and generally having a defined outer fiber form or geometry. Examples of usable fiber types are listed hereinbelow. The proportion by weight can be determined for example gravimetrically after dissolving the product and drying the fibers of solvent. The person skilled in the art knows solvents for the selective dissolution of the polymer while maintaining fiber integrity. As an alternative, the fiber content can be determined via the methods mentioned above such as TGA and elemental analysis. More preferably, the fiber proportion by weight can be 1% to 18%, particularly preferably 1.5% to 15% and very particularly preferably 2% to 12%.

The fibers have an aspect ratio of ≥100. The aspect ratio here describes the ratio of the depth or height of a structure to its (smallest) lateral extent. If the fiber has a varying diameter or a varying length, the averages over all of the fibers can be used for the aspect ratio. The fibers preferably have an aspect ratio of greater than 200, further preferably of greater than 500, and more preferably of greater than 1000. Smaller aspect ratios can be disadvantageous since products containing these fibers may not have the required mechanical anisotropy.

The fibers usable according to the invention have a length of ≥3 cm and ≤1000 cm. This fiber length range has proven to be particularly suitable for the obtaining of a 3D-printed product having highly anisotropic mechanical properties. The range indicates that at least 95% of the number of fibers have a length within the range given above, that is to say are within the range. A certain proportion of smaller fiber lengths, for example obtained by fiber breakage during production, is likewise in accordance with the invention. These fiber lengths can be used to obtain extremely stable 3D-printed products which, due to the fiber properties in combination with the polymers used, display a high anisotropy in the mechanical properties. The fibers can preferably also be >7 cm and ≤500 cm, further preferably >10 cm and <100 cm, long.

The product is at least partially produced by means of a FFF (Fused Filament Fabrication) process. The extruded polymer can in this case optionally be post-crosslinked in a downstream process. The post-crosslinking can be effected here by reacting the polymer with water as a result of a conversion of, for example, isocyanate groups to ureas and/or by radiation curing and/or by heat treatment at temperatures at least above the glass transition point of the polymer. However, the shaping of the product is wholly or partially effected via a 3D printing process, wherein at least a region of the product comprising fiber reinforcement has to have been produced via the 3D printing process. The production process used according to the invention is "fused filament fabrication", that is to say production via molten (polymeric) filaments. The invention also encompasses a situation where partial regions of the product have not been produced by a 3D printing process. Products can thus result which have in isolation one or more sections having the material properties required in the independent claim.

The product, in the region of the fiber reinforcement and in the direction of the fiber symmetry axis, has a tensile modulus measured according to DIN EN ISO 527-1 of ≥1.5 GPa. According to the invention, "in the region of the fiber reinforcement" means that the mechanical properties are measured at those points on the product which have a fiber reinforcement. To this end, samples can be taken from these regions and subjected to mechanical analysis. Values obtained by measurements at regions without fiber reinforcement are not in accordance with the invention. The measured specimens accordingly must have or contain at least one fiber. In the event of production-related variations of the moduli, according to the invention it is the average of samples measured at three different points of the product which counts. The moduli are collected on the finished product, that is to say possibly after further treatment steps such as heat treatment/cooling/post-crosslinking.

According to the invention, the symmetry axis of a fiber is parallel to the longitudinal axis of the fiber, that is to say parallel to the fiber axis having the greatest spatial fiber extent, as described above. If the fiber is not monotonically aligned within the product, the symmetry axis of the fiber is the average of the individual segment symmetry axes. According to the invention, the tensile modulus in the direction of the fiber symmetry axis also results for the cases in which the deviations between the measurement direction and fiber symmetry axis are less than 20°, preferably less than 10°, furthermore less than 5°. Within these deviations, the requirements of anisotropy and elasticity of the product can still be satisfied. Within preferred embodiments, the modulus in the symmetry axis direction on the finished product can be greater than 1.7 GPa, more preferably >2 GPa, further preferably >3 GPa, and likewise preferably >4 GPa. Within these modulus magnitudes, high loads can be absorbed by the product. Moduli smaller than 1.5 GPa can be disadvantageous since the products can lack the required mechanical stability due to excessively high elasticity.

The product according to the invention also, in the region of the fiber reinforcement and perpendicular to the fiber symmetry axis, has a tensile modulus measured according to DIN EN ISO 527-1 of ≤1.2 GPa. The measurement is effected on the finished product, that is to say possibly after further processing steps such as heat treatment/cooling/post-crosslinking, which may still influence the mechanical properties of the product. The tensile modulus is measured perpendicular to the fiber symmetry axis when the average alignment of the fibers present in the specimen encloses an angle of greater than or equal to 75° and less than or equal to 105° with the measurement direction. The measurement is made in the region of the fiber reinforcement when the specimen measured comprises at least one of the fibers according to the invention. The tensile modulus can preferably also be <1.0 GPa, preferably <0.8 GPa, less than 0.6 GPa and further preferably <0.4 GPa. These limits in the tensile modulus have proven useful for obtaining highly anisotropic workpieces. Moduli lower than <0.05 GPa may be disadvantageous since the products can lack the necessary strength in these cases. Higher moduli can result in only minor anisotropy of the product, which is not in accordance with the invention.

The product according to the invention also, in the region of the fiber reinforcement and perpendicular to the fiber symmetry axis, has a yield point of >5%, measured according to DIN EN ISO 527-1. In order to obtain products having the highest possible mechanical anisotropy, the yield points given above have been found to be particularly advantageous. As a result of these yield points, the product can be made sufficiently elastic for many areas of use, so that preferred use properties result in the application. For example, dental splints can be easily inserted and removed again due to the high yield point. The yield point can preferably also be >7%, more preferably >9%, further preferably >11% and likewise >15%.

In a preferred embodiment, the product can be rotationally symmetrical in at least one three-dimensional section and the symmetry axis of the fibers can be aligned perpendicular to the symmetry axis of the product. The product can thus be rotationally symmetrical as a whole or, in the case of complex products having a plurality of shapes set together, a part of the product. Examples of these preferred embodiments are, for example, O-rings or V-belts, these structures being rotationally symmetrical and the symmetry axis extending through the center of the product. A preferred material combination for O-rings would be TPU/polyaramid fiber. The symmetry axis of the fibers for these products extends parallel to the circumference of the products and hence perpendicular to the symmetry axis of the product. According to the invention, both symmetry axes are perpendicular to each other in the cases where they enclose an angular range of greater than or equal to 75° and less than or equal to 105° with each other. This geometrical relationship can lead to particularly suitable products having excellent strength in the load direction and a high elasticity.

Within a further configuration, the product can have an aspect ratio of ≥1 and the symmetry axis of the fibers lies essentially in a plane with the product axis having the greatest extent. The products according to the invention having the anisotropic mechanical properties are suitable in particular for the manufacture of products having asymmetrical dimensions, where the mechanical fiber stabilization of the products lies in a plane with the greatest product extent. As a result, the product can be maximally stabilized by the fiber incorporation. In further preferred embodiments, the product can have an aspect ratio of ≥3, preferably ≥5, further preferably ≥10 and more preferably >15.

Within a further characteristic, the product, in the region of the fiber reinforcement, can have a loss factor tan δ of ≤0.07, measured by means of dynamic mechanical analysis (DMA) in tensile loading, and a yield point in the direction of the fiber symmetry axis of <7% measured according to DIN EN ISO 527-1. These mechanical properties of the product preferably contribute to a high strength and durability of the product in the fiber direction. The reason for the low yield point and the loss factor according to the invention can in this case be seen in the combination of the fibers usable according to the invention and the elastic polymer. Higher yield points can be disadvantageous, since the printed product in these cases may exhibit only inadequate resistance to a mechanical loading of the product. The loss factor can preferably be <0.06, preferably <0.05, furthermore <0.04 and more preferably <0.03. These loss factors can contribute to a particularly strong anisotropy of the mechanical properties of the product. The yield point can be determined here at 23° C. and the yield point can preferably also be <3%, particularly preferably <2% and very particularly preferably <1%.

Within a further aspect of the product, the polymer can be a thermoplastic elastomer. Thermoplastic elastomers (TPEs) are materials in which elastic polymer chains are embedded in thermoplastic material. They can be processed in a purely physical process in a combination of high shear forces, the action of heat and subsequent cooling. Although no chemical crosslinking via a time-consuming and temperature-intensive vulcanization, as in the case of elastomers, is necessary, the parts produced still have rubber-elastic properties due to their special molecular structure. Renewed application of heat and shear forces leads again to melting and deformation of the material. However, this means at the same time that the TPEs are much less thermally and dynamically durable than standard elastomers. TPEs are thus not a "successor product" to conventional elastomers, but rather a complement which combines the processing advantages of thermoplastics with the material properties of elastomers.

Thermoplastic elastomers have in some areas physical crosslinking points (secondary valence forces or crystallites) which dissolve upon heating without the macromolecules decomposing. They can therefore be processed significantly better than normal elastomers. Plastic waste can also for instance be remelted and processed further. However, this is also the reason why the material properties of thermoplastic elastomers change in a nonlinear manner over time and temperature.

The two major measurable physical material properties are the compression set and stress relaxation. Compared to ethylene-propylene-diene rubber (EPDM), they have poorer material properties in terms of short-term behavior and the raw material is in addition more expensive. However, in terms of long-term behavior, the picture is reversed compared to EPDM.

Since the processing process is in principle the same as that for thermoplastics, short cycle times are similarly possible. In manufacturing, thermoplastic elastomers are seeing increasing use in bodywork seals for automobiles and in construction elements. They can be extruded, injection-molded or else blow-molded, and are generally purchased in a ready-to-use state.

A distinction is made between copolymers and elastomer alloys depending on the internal structure.

Copolymers are used either as random copolymers or as block copolymers. The former consist of a crystallizing (and hence physically crosslinking) main polymer such as for example polyethylene, the degree of crystallization of which is reduced by a comonomer such as, for example, vinyl acetate, which is randomly incorporated along the chain, to such an extent that the crystallites (=the hard phase) are no longer in direct contact in the finished material (EVA in the example). They then act as isolated crosslinking points, as in conventional elastomers.

In block copolymers, the hard and soft segments in a molecule are clearly separated (e.g. SBS, SIS). In TPEs, the material separates below a certain temperature into a continuous and a discontinuous phase. As soon as the latter falls below its glass transition temperature Tg (the Tg of the continuous phase lies far below the later use temperature), they act once again as crosslinking point.

Elastomer alloys are polyblends, that is to say mixtures (blends) of finished polymers. The plastic thus consists of two or more molecule types. Varying mixture ratios and additives afford tailored materials (for example polyolefin elastomer formed from polypropylene (PP) and natural rubber (NR)—they cover a wide range of hardnesses depending on the ratio).

A distinction is made between the following groups:
TPE-A or TPA=thermoplastic copolyamides, e.g. PEBAX (Arkema)
TPE-E or TPC=thermoplastic polyester elastomers/thermoplastic copolyesters, e.g. Keyflex (LG Chem)
TPE-O or TPO=olefin-based thermoplastic elastomers, predominantly PP/EPDM
TPE-S or TPS=styrene block copolymers (SBS, SEBS, SEPS, SEEPS and MBS), e.g. Kraton (Kraton Polymers), Septon (Kuraray), Styroflex (BASF), Thermolast (Kraiburg TPE) or Saxomer (PCW)
TPE-U or TPU=urethane-based thermoplastic elastomers, e.g. Elastollan (BASF) or Desmopan, Texin, Utechllan (Covestro)
TPE-V or TPV=thermoplastic vulcanizates or crosslinked olefin-based thermoplastic elastomers, predominantly PP/EPDM, e.g. Sarlink (DSM)

Thermoplastic elastomers can for example also be selected from the group of thermoplastic copolyamides (TPA), thermoplastic copolyesters (TPC), olefin-based thermoplastic elastomers (TPO), styrene block copolymers (TPS), urethane-based thermoplastic elastomers (TPU), crosslinked olefin-based thermoplastic elastomers (TPV), polyvinyl chloride (PVC)-based thermoplastic elastomers, silicone-based thermoplastic elastomers or a combination of at least two of these elastomers. Combinations of ≥3, ≥4 or ≥5 of these elastomers are also possible. The elastic polymer can also comprise further additives such as fillers, stabilizers and the like, and also further polymers. The total content of additives in the elastic polymer can by way of example be ≥0.1% by weight to ≤70% by weight, preferably ≥1% by weight to ≤50% by weight. This group of thermoplastic elastomers can contribute to a large extent to products having great mechanical anisotropy.

In a further preferred embodiment of the use according to the invention, the elastomer is a thermoplastic elastomer and has a melting range (DSC, differential scanning calorimetry; second heating at a heating rate of 20 K/min) of ≥20° C. to ≤280° C. (preferably ≥40° C. to ≤250° C., more preferably ≥50° C. to ≤220° C.), a Shore A hardness according to DIN ISO 7619-1 of ≥40 to ≤98 (preferably ≥50 to ≤95, more preferably ≥60 to ≤90) and a melt volume rate (MVR) according to ISO 1133 (measured 120° C. above the melting point, 10 kg) of ≥5 to ≤200 (preferably ≥10 to ≤150, more preferably ≥15 to ≤100) cm$^3$/10 min.

Within a preferred embodiment of the product, the polymer may be a polyurethane or a rubber. The rubber can constitute the base material here and be used before curing or vulcanization. In the art, vulcanized rubber (plural: vulcanized rubbers) denotes the vulcanizates of natural and synthetic rubbers. (Jürgen Falbe, Manfred Regitz (Eds.): CD Römpp Chemie Lexikon, Thieme, Stuttgart, 1995). This selection of polymers can lead to particularly elastic and mechanically strongly anisotropic products.

The thermoplastic elastomer can in a preferred embodiment be a thermoplastic polyurethane elastomer.

In a further preferred embodiment of the use according to the invention, the elastomer is a thermoplastic polyurethane elastomer obtainable from the reaction of the following components:
 a) at least one organic diisocyanate
 b) at least one compound having groups reactive toward isocyanate groups and having a number-average molecular weight (Mn) of ≥500 g/mol to ≤6000 g/mol and a number-average functionality of the sum total of the components b) of ≥1.8 to ≤2.5
 c) at least one chain extender having a molecular weight (Mn) of 60-450 g/mol and a number-average functionality of the sum total of the chain extenders c) of 1.8 to 2.5.

For synthesis of this thermoplastic polyurethane elastomer (TPU), specific examples of isocyanate components a) include: aliphatic diisocyanates such as ethylene diisocyanate, tetramethylene 1,4-diisocyanate, hexamethylene 1,6-diisocyanate, dodecane 1,12-diisocyanate, cycloaliphatic diisocyanates such as isophorone diisocyanate, cyclohexane 1,4-diisocyanate, 1-methylcyclohexane 2,4-diisocyanate and 1-methylcyclohexane 2,6-diisocyanate and the corresponding isomer mixtures, dicyclohexylmethane 4,4'-diisocyanate, dicyclohexylmethane 2,4'-diisocyanate and dicyclohexylmethane 2,2'-diisocyanate and the corresponding isomer mixtures, and also aromatic diisocyanates such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane and naphthylene 1,5-diisocyanate. Preference is given to using hexamethylene 1,6-diisocyanate, cyclohexane 1,4-diisocyanate, isophorone diisocyanate, dicyclohexylmethane diisocyanate, diphenylmethane diisocyanate isomer mixtures having a diphenylmethane 4,4'-diisocyanate content of more than 96% by weight and especially diphenylmethane 4,4'-diisocyanate and naphthylene 1,5-diisocyanate. These diisocyanates can be used individually or in the form of mixtures with one another. They may also be used together with up to 15 mol % (based on total diisocyanate) of a polyisocyanate, but the maximum amount of polyisocyanate that may be added is such as to result in a product that is still thermoplastically processible. Examples of polyisocyanates are triphenylmethane 4,4',4''-triisocyanate and polyphenylpolymethylene polyisocyanates.

Examples of longer-chain isocyanate-reactive compounds b) that may be mentioned are those having on average at least 1.8 to 3.0 Zerewitinoff-active hydrogen atoms and a number-average molecular weight of 500 to 10 000 g/mol. These include, in addition to compounds having amino groups, thiol groups or carboxyl groups, especially compounds having two to three, preferably two, hydroxyl groups, specifically those having number-average molecular weights Mn of 500 to 6000 g/mol, particularly preferably those having a number-average molecular weight Mn of 600 to 4000 g/mol, for example hydroxyl group-containing polyester polyols, polyether polyols, polycarbonate polyols and polyester polyamides. Suitable polyester diols may be prepared by reacting one or more alkylene oxides having 2 to 4 carbon atoms in the alkylene radical with a starter molecule containing two active hydrogen atoms in bonded form. Examples of alkylene oxides include: ethylene oxide, 1,2-propylene oxide, epichlorohydrin and 1,2-butylene oxide and 2,3-butylene oxide. Preference is given to using ethylene oxide, propylene oxide and mixtures of 1,2-propylene oxide and ethylene oxide. The alkylene oxides may be used individually, in alternating succession or as mixtures. Starter molecules that can be used are by way of example water, amino alcohols such as N-alkyldiethanolamines, for example N-methyldiethanolamine, and diols such as ethylene glycol, 1,3-propylene glycol, butane-1,4-diol and hexane-1,6-diol. It is also optionally possible to use mixtures of starter molecules. Other suitable polyether diols are the hydroxyl group-containing polymerization products of tetrahydrofuran. It is also possible to use trifunctional polyethers in proportions of 0% to 30% by weight, based on the bifunctional polyether diols, but at most in such an amount as to result in a product that is still thermoplastically processible. The essentially linear polyether diols preferably have number-average molecular weights Mn of 500 to 6000 g/mol. They can be used either individually or in the form of mixtures with one another.

Suitable polyester diols may be prepared for example from dicarboxylic acids having 2 to 12 carbon atoms, preferably 4 to 6 carbon atoms, and polyhydric alcohols. Examples of dicarboxylic acids that can be used are: aliphatic dicarboxylic acids such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids may be used individually or as mixtures, for example in the form of a succinic, glutaric and adipic acid mixture. To prepare the polyester diols, it may possibly be advantageous to employ not the dicarboxylic acids but rather the corresponding dicarboxylic acid derivatives such as carboxylic diesters having 1 to 4 carbon atoms in the alcohol radical, carboxylic anhydrides or carbonyl chlorides. Examples of polyhydric alcohols are glycols having 2 to 10, preferably 2 to 6, carbon atoms, for example ethylene glycol, diethylene glycol, butane-1,4-diol, pentane-1,5-diol, hexane-1,6-diol, decane-1,10-diol, 2,2-dimethylpropane-1,3-diol, propane-1,3-diol or dipropylene glycol. Depending on the desired properties, the polyhydric alcohols may be used alone or in a mixture with one another. Also suitable are esters of carbonic acid with the diols mentioned, especially those having 4 to 6 carbon atoms, such as butane-1,4-diol or hexane-1,6-diol, condensation products of ω-hydroxycarboxylic acids such as ω-hydroxycaproic acid, or polymerization products of lactones, for example optionally substituted ω-caprolactone. Polyester diols used are preferably ethanediol polyadipates, butane-1,4-diol polyadipates, ethanediol butane-1,4-diol polyadipates, hexane-1,6-diol neopentyl glycol polyadipates, hexane-1,6-diol butane-1,4-diol polyadipates, and polycaprolactones. The polyester diols preferably have number-average molecular weights Mn of 450 to 6000 g/mol and can be employed individually or in the form of mixtures with one another.

The chain extenders c) have an average of 1.8 to 3.0 Zerewitinoff-active hydrogen atoms and have a molecular weight of 60 to 450 g/mol. This is understood to mean not only compounds having amino groups, thiol groups or carboxyl groups, but also those having two to three, preferably two, hydroxyl groups.

Chain extenders used are preferably aliphatic diols having 2 to 14 carbon atoms, for example ethanediol, propane-1,2-diol, propane-1,3-diol, butane-1,4-diol, butane-2,3-diol, pentane-1,5-diol, hexane-1,6-diol, diethylene glycol and dipropylene glycol. Also suitable, however, are diesters of terephthalic acid with glycols having 2 to 4 carbon atoms, for example terephthalic acid bis-ethylene glycol or terephthalic acid bis-butane-1,4-diol, hydroxyalkylene ethers of hydroquinone, for example 1,4-di(b-hydroxyethyl)hydroquinone, ethoxylated bisphenols, for example 1,4-di(b-hydroxyethyl)bisphenol A, (cyclo)aliphatic diamines, such as isophoronediamine, ethylenediamine, propylene-1,2-diamine, propylene-1,3-diamine, N-methylpropylene-1,3-diamine, N,N'-dimethylethylenediamine and aromatic diamines such as tolylene-2,4-diamine, tolylene-2,6-diamine, 3,5-diethyltolylene-2,4-diamine or 3,5-diethyltolylene-2,6-diamine or primary mono-, di-, tri- or tetraalkyl-substituted 4,4'-diaminodiphenylmethanes. Chain extenders used with particular preference are ethanediol, butane-1,4-diol, hexane-1,6-diol, 1,4-di(β-hydroxyethyl)hydroquinone or 1,4-di(β-hydroxyethyl)bisphenol A. Mixtures of the abovementioned chain extenders can also be employed.

In addition, relatively small amounts of triols may also be added.

Compounds that are monofunctional toward isocyanates can be used under f) as what are called chain terminators in proportions of up to 2% by weight, based on TPU. Suitable examples include monoamines such as butyl- and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether.

When the intention is to produce thermoplastically processible polyurethane elastomers, the isocyanate-reactive substances should preferably be chosen such that their number-average functionality does not significantly exceed two. If higher-functionality compounds are used, the overall functionality should accordingly be lowered using compounds having a functionality of ≤2. The relative amounts of isocyanate groups and isocyanate-reactive groups are preferably chosen such that the ratio is 0.9:1 to 1.2:1, preferably 0.95:1 to 1.1:1.

The thermoplastic polyurethane elastomers used in accordance with the invention may comprise, as auxiliaries and/or additive substances, up to a maximum of 20% by weight, based on the total amount of TPUs, of the customary auxiliaries and additive substances. Typical auxiliaries and additive substances are catalysts, antiblocking agents, inhibitors, pigments, colorants, flame retardants, stabilizers against ageing and weathering effects and against hydrolysis, light, heat and discoloration, plasticizers, lubricants and demolding agents, fungistatic and bacteriostatic substances, reinforcing agents and inorganic and/or organic fillers and mixtures thereof.

Examples of the additive substances are lubricants, such as fatty acid esters, metal soaps thereof, fatty acid amides, fatty acid ester amides and silicone compounds, and reinforcing agents, for example fibrous reinforcing agents, such as inorganic fibers, which are produced according to the prior art and can also be provided with a size. Further information about the auxiliaries and additive substances mentioned may be found in the specialist literature, for example in the monograph by J. H. Saunders and K. C. Frisch "High Polymers", volume XVI, Polyurethanes, parts 1 and 2, Interscience Publishers 1962/1964, in "Taschenbuch der Kunststoff-Additive" [Handbook of plastics additives] by R. Gächter and H. Müller (Hamer Verlag Munich 1990) or in DE-A 29 01 774.

Suitable catalysts are the customary tertiary amines known from the prior art, for example triethylamine, dimethylcyclohexylamine, N-methylmorpholine, N,N'-dimethylpiperazine, 2-(dimethylaminoethoxy)ethanol, diazabicyclo[2.2.2]octane and the like and also in particular organic metal compounds such as titanic esters, iron compounds or tin compounds such as tin diacetate, tin dioctoate, tin dilaurate or the dialkyltin salts of aliphatic carboxylic acids such as dibutyltin diacetate or dibutyltin dilaurate or the like. Preferred catalysts are organic metal compounds, especially titanic esters, iron compounds and tin compounds. The total amount of catalysts in the TPUs used is generally about 0% to 5% by weight, preferably 0% to 2% by weight, based on the total amount of TPUs.

Polyurethane elastomers suitable according to the invention may include for example 2-component cast elastomers. These are obtainable by known methods from a reaction mixture comprising:
  a) at least one organic polyisocyanate
  b) at least one compound having groups reactive toward isocyanate groups and having a number-average molecular weight (Mn) of ≥500 g/mol to ≤6000 g/mol and at least a number-average functionality of the sum total of the components of ≥2.1
  c) optionally at least one chain extender having a molecular weight (Mn) of 60-450 g/mol.

For details of polyisocyanates and NCO-reactive compounds reference is made to what is stated above.

In a further preferred embodiment of the use according to the invention, the elastomer is a thermoplastic elastomer and has a melting range (DSC, differential scanning calorimetry; 2nd heating at a heating rate of 5 K/min.) of ≥20° C. to ≤100° C. and has a magnitude of the complex viscosity |η*| (determined by viscometry measurement in the melt with a plate/plate oscillation shear viscometer at 100° C. and a shear rate of 1/s) of ≥10 Pas to ≤1 000 000 Pas.

This thermoplastic elastomer has a melting range of ≥20° C. to ≤100° C., preferably of ≥25° C. to ≤90° C. and more preferably of ≥30° C. to ≤80° C. In the DSC measurement for determination of the melting range, the material is subjected to the following temperature cycle: 1 minute at −60° C., then heating to 200° C. at 5 kelvin/minute, then cooling to −60° C. at 5 kelvin/minute, then 1 minute at −60° C., then heating to 200° C. at 5 kelvin/minute.

It is possible that the temperature interval between the start of the melting operation and the end of the melting operation as determinable by the above DSC protocol is ≤20° C., preferably ≤10° C. and more preferably ≤5° C.

This thermoplastic elastomer also has a magnitude of the complex viscosity |η*| (determined by viscometry measurement in the melt with a plate/plate oscillation viscometer according to ISO 6721-10 at 100° C. and a shear rate of 1/s) of ≥10 Pas to ≤1 000 000 Pas. Preferably, |η*| is ≥100 Pas to ≤500 000 Pas, more preferably ≥1000 Pas to ≤200 000 Pas.

The magnitude of the complex viscosity |η*| describes the ratio of the viscoelastic moduli G' (storage modulus) and G" (loss modulus) to the excitation frequency ω in a dynamic-mechanical material analysis:

This thermoplastic elastomer is preferably a thermoplastic polyurethane elastomer. In a further preferred embodiment of the product according to the invention, the elastomer is a thermoplastic polyurethane elastomer obtainable from the reaction of a polyisocyanate component and a polyol component, the polyol component comprising a polyester polyol having a no-flow point (ASTM D5985) of ≥25° C.

Optionally, in the reaction to afford this polyurethane, it is also possible to use diols from the molecular weight range of ≥62 to ≤600 g/mol as chain extenders.

This polyisocyanate component may comprise a symmetric polyisocyanate and/or a nonsymmetric polyisocyanate. Examples of symmetric polyisocyanates are 4,4'-MDI and HDI.

In the case of nonsymmetric polyisocyanates, the steric environment of one NCO group in the molecule is different than the steric environment of a further NCO group. One isocyanate group then reacts more quickly with isocyanate-reactive groups, for example OH groups, while the remaining isocyanate group is less reactive. One consequence of the nonsymmetric structure of the polyisocyanate is that the polyurethanes formed with these polyisocyanates also have a less linear structure.

Examples of suitable nonsymmetric polyisocyanates are selected from the group comprising: 2,2,4-trimethylhexamethylene diisocyanate, ethylethylene diisocyanate, nonsymmetric isomers of dicyclohexylmethane diisocyanate (H12-MDI), nonsymmetric isomers of 1,4-diisocyanatocyclohexane, nonsymmetric isomers of 1,3-diisocyanatocyclohexane, nonsymmetric isomers of 1,2-diisocyanatocyclohexane, nonsymmetric isomers of 1,3-diisocyanatocyclopentane, nonsymmetric isomers of 1,2-diisocyanatocyclopentane, nonsymmetric isomers of 1,2-diisocyanatocyclobutane, 1-isocyanatomethyl-3-isocyanato-1,5,5-trimethylcyclohexane (isophorone diisocyanate, IPDI), 1-methyl-2,4-diisocyanatocyclohexane, 1,6-diisocyanato-2,2,4-trimethylhexane, 1,6-diisocyanato-2,4,4-trimethylhexane, 5-isocyanato-1-(3-isocyanatoprop-1-yl)-1,3,3-trimethylcyclohexane, 1-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, 2-heptyl-3,4-bis(9-isocyanatononyl)-1-pentylcyclohexane, norbornane diisocyanatomethyl, diphenylmethane 2,4'-diisocyanate (MDI), tolylene 2,4- and 2,6-diisocyanate (TDI), derivatives of the diisocyanates listed, especially dimerized or trimerized types, or a combination of at least two of these.

Preferred as the polyisocyanate component are 4,4'-MDI or a mixture comprising IPDI and HDI.

This polyol component can include a polyester polyol having a no-flow point (ASTM D5985) of ≥25° C., preferably ≥35° C., more preferably ≥35° C. to ≤55° C. To determine the no-flow point, a test vessel containing the sample is set in slow rotation (0.1 rpm). A flexibly mounted measuring head is immersed in the sample and, on attainment of the no-flow point, is moved away from its position as a result of the abrupt increase in viscosity; the resulting tipping motion triggers a sensor.

Examples of polyester polyols which can have such a no-flow point are reaction products of phthalic acid, phthalic anhydride or symmetric α,ω-C4- to C10-dicarboxylic acids with one or more C2- to C10-diols. They preferably have a number-average molecular weight Mn of ≥400 g/mol to ≤6000 g/mol. Suitable diols are especially monoethylene glycol, butane-1,4-diol, hexane-1,6-diol and neopentyl glycol.

Preferred polyester polyols are specified hereinafter, stating their acid and diol components: adipic acid+monoethylene glycol; adipic acid+monoethylene glycol+butane-1,4-diol; adipic acid+butane-1,4-diol; adipic acid+hexane-1,6-diol+neopentyl glycol; adipic acid+hexane-1,6-diol; adipic acid+butane-1,4-diol+hexane-1,6-diol; phthalic acid (anhydride)+monoethylene glycol+trimethylolpropane; phthalic acid (anhydride)+monoethylene glycol. Preferred polyurethanes are obtained from a mixture comprising IPDI and HDI as polyisocyanate component and a polyol component comprising an aforementioned preferred polyester polyol. Particular preference is given to the combination of a mixture comprising IPDI and HDI as polyisocyanate component with a polyester polyol formed from adipic acid+butane-1,4-diol+hexane-1,6-diol for formation of the polyurethanes.

It is further preferred when these polyester polyols have an OH number (DIN 53240) of ≥25 to ≤170 mg KOH/g and/or a viscosity (75° C., DIN 51550) of ≥50 to ≤5000 mPas.

One example is a polyurethane obtainable from the reaction of a polyisocyanate component and a polyol component, where the polyisocyanate component comprises an HDI and IPDI and where the polyol component comprises a polyester polyol which is obtainable from the reaction of a reaction mixture comprising adipic acid and also hexane-1,6-diol and butane-1,4-diol with a molar ratio of these diols of ≥1:4 to ≤4:1 and which has a number-average molecular weight Mn (GPC, against polystyrene standards) of ≥4000 g/mol to ≤6000 g/mol. Such a polyurethane may have a magnitude of the complex viscosity |η*| (determined by viscometry measurement in the melt with a plate/plate oscillation viscometer according to ISO 6721-10 at 100° C. and a shear rate of 1/s) of ≥4000 Pas to ≤160 000 Pas.

Further examples of suitable polyurethanes are:

Substantially linear polyester polyurethanes having terminal hydroxyl groups as described in EP 019 294 6 A1, prepared by reaction of
  a) polyester diols having a molecular weight above 600 and optionally
  b) diols from the molecular weight range from 62 to 600 g/mol as chain extenders with
  c) aliphatic diisocyanates,
while observing an equivalents ratio of hydroxyl groups of components a) and b) to isocyanate groups of component c) of 1:0.9 to 1:0.999, wherein component a) consists to an extent of at least 80% by weight of polyester diols from the molecular weight range of 4000 to 6000 based on (i) adipic acid and (ii) mixtures of 1,4-dihydroxybutane and 1,6-dihydroxyhexane in a molar ratio of the diols of 4:1 to 1:4.

In the polyester polyurethanes mentioned above, it is preferable when component a) consists to an extent of 100% of a polyester diol from the molecular weight range from 4000 to 6000, the preparation of which involved using, as diol mixture, a mixture of 1,4-dihydroxybutane and 1,6-dihydroxyhexane in a molar ratio of 7:3 to 1:2.

In the polyester polyurethanes mentioned above, it is also preferable when component c) comprises IPDI and also HDI.

In the polyester polyurethanes mentioned above, it is also preferable when the preparation thereof involved also using, as component b), alkanediols selected from the group consisting of: 1,2-dihydroxyethane, 1,3-dihydroxypropane, 1,4-dihydroxybutane, 1,5-dihydroxypentane, 1,6-dihydroxyhexane or a combination of at least two of these in an amount of up to 200 hydroxyl equivalent percent based on component a).

It is also possible that the thermoplastic elastomer, after heating to 100° C. and cooling to 20° C. at a cooling rate of 4° C./min, within a temperature interval from 25° C. to 40° C. for ≥1 minute (preferably ≥1 minute to ≤30 minutes, more preferably ≥10 minutes to ≤15 minutes), has a storage modulus G' (determined at the respectively prevailing temperature with a plate/plate oscillation viscometer according to ISO 6721-10 at a shear rate of 1/s) of ≥100 kPa to ≤1 MPa and, after cooling to 20° C. and storage for 20 minutes, has a storage modulus G' (determined at 20° C. with a plate/plate oscillation viscometer according to ISO 6721-10 at a shear rate of 1/s) of ≥10 MPa.

Usable materials can consist of or contain natural or synthetic rubber, for example.

The synthetic rubber may preferably be selected from the group consisting of vulcanized or unvulcanized Thiokol rubber, EVA (ethylene-vinyl acetate copolymer rubber), FPVC (flexible polyvinyl chloride rubber), FZ rubber (fluorinated polyphosphazene rubber), GPO (propylene oxide rubber), HNBR (hydrogenated nitrile-butadiene rubber), HSN (highly saturated nitrile rubber), ACM (acrylic rubber), VAMAC (polyethylene-co-acrylic acid rubber), PNR (polynorbornene rubber), PZ (polyphosphazene rubber), ABR (acrylate-butadiene rubber), ACM rubber (copolymer of ethyl or other acrylates with a small proportion of a vulcanizing monomer), AECO rubber (terpolymer of allyl glycidyl ether, ethylene oxide and epichlorohydrin), AEM rubber (copolymer of ethyl or other acrylates and ethylenes), AFMU rubber (terpolymer of tetrafluoroethylene, trifluoronitrosomethane and nitrosoperfluorobutyric acid), ANM rubber (copolymer of ethyl or other acrylates and acrylonitrile), AU (polyester urethane rubber), BIIR (bromoisobutene-isoprene rubber (bromobutyl rubber), BR (butadiene rubber), CFM (polychlorotrifluoroethylene rubber), CIIR (chloro-isobutene-isoprene rubber (chloro rubber)), CM (chlorinated polyethylene rubber), CO (epichlorohydrin rubber), CR (chloroprene rubber), CSM (chlorosulfonated polyethylene rubber), ECO (ethylene oxide and epichlorohydrin copolymer rubber), EAM (ethylene-vinyl acetate copolymer rubber), EPDM (terpolymer of ethylene, propylene and a diene having a residual amount of the unsaturated diene in the side chain of the rubber), EPM (ethylene-propylene copolymer rubber), EU (polyether urethane rubber), FFKM (perfluoro rubber of the polymethylene type with all substituents of the polymer chain being fluoro, perfluoroalkyl or perfluoroalkoxy groups), FKM (fluoro rubber of the polymethylene type having the substituents fluoro and perfluoroalkoxy groups on the main chain), FVMQ (silicone rubber having fluoro, vinyl and methyl substituents on the polymer chain), GPO (polypropylene oxide rubber), IIR (isobutene-isoprene rubber (butyl rubber)), IM (polyisobutene rubber), IR (isoprene rubber (synthetic)), MQ (silicone rubber having only methyl substituents on the polymer chain), NBR (nitrile-butadiene rubber (nitrile rubber)), NIR (nitrile-isoprene rubber), PBR (pyridine-butadiene rubber), PMQ (silicone rubber having only methyl and phenyl groups on the polymer chain), PSBR (pyridine-styrene-butadiene rubber), PVMQ (silicone rubber having methyl, phenyl and vinyl substituents on the polymer chain), Q (rubber containing silicone in the polymer chain), SBR (styrene-butadiene rubber), T (rubber containing sulfur in the polymer chain (without CR-based copolymers)), VMQ (silicone rubber having methyl and vinyl substituents in the polymer chain), XNBR (carboxyl-nitrile-butadiene rubber (carboxynitrile rubber)), XSBR (carboxyl-styrene-butadiene rubber).

The rubber may preferably also consist of or contain two components. The first material or the further material can preferably include a component from the group consisting of polyacrylic rubber (ACM), styrene-butadiene rubber (SBR), polysiloxane (SI), vinyl methyl silicone (VMQ), nitrile rubber (NR), (hydrogenated nitrile rubber, (HNBR), carboxylated nitrile rubber (XNBR), carboxylated hydrogenated nitrile rubber (XHNBR), ethylene-propylene copolymer rubber (EPDM), polychloroprene rubber (CR), Vamac, fluoro rubber (FKM), isobutylene rubber (IIR), polybutadiene rubber (BR) or a mixture of at least two of these components.

In a preferred embodiment, the synthetic rubber can comprise further additives selected from the group consisting of organic or inorganic fillers, a plasticizer, a metal oxide, anti-degradation agents (against oxidation, hydrolysis, yellowing, ozone attack, etc.), processing auxiliaries, silanes, a coagent and a hardener, or a combination of at least two of these. Examples of an inorganic filler include Carbon Black N330 or silicon dioxide, chopped glass fibers/chopped carbon fibers/chopped natural fibers, examples of a plasticizer include phthalate esters such as dioctyl phthalate, an example of a metal oxide is ZnO, an example of an anti-degradation agent is Irganox 1010 (pentaerythritol tetrakis (3-(3,5-di-tert-butyl-4-hydroxyphenyl)propionate)), an example of a processing auxiliary is stearic acid, examples of a coagent include polybutadiene, triallyl isocyanurate (TAIC) or mixtures of these, and an example of a crosslinker is di(tert-butylperoxyisopropyl)benzene, such as Perkadox 14/40.

After vulcanization or curing of the rubber, it can be referred to as vulcanized rubber. However, in the literature and in the naming of raw materials, the terms rubber and vulcanized rubber are frequently used synonymously. It is essential that the raw materials according to the invention are brought into the desired shape in the uncrosslinked, unvulcanized, uncured state by means of an additive manufacturing process and only in a subsequent process step cured, crosslinked, or vulcanized, typically by thermal storage.

In a preferred embodiment of the product, the fibers can be selected from the group consisting of glass, carbon, basalt, polyester, polyethylene, polyurethane, polyamide, polyaramid, metal or cellulose fibers, or mixtures of these. In a particular embodiment, the polymer and the fiber can belong to the same polymer material class, although the processing of the fiber in the additive manufacturing process is always effected below the melting temperature Tm of the fiber. These fibers are capable of providing sufficient mechanical strength to the products and in addition supply the desired mechanical anisotropy of the product. Organic fibers that are suitable in accordance with the invention are aramid fibers, carbon fibers, polyester fibers, nylon fibers, rayon and Plexiglas fibers. Natural fibers that are suitable in accordance with the invention are flax fibers, hemp fibers, wood fibers, cotton fibers, cellulose fibers and sisal fibers. In a particular embodiment of the application, the fibers are transparent to visible light. This is particularly advantageous when, within the context of the component according to the invention, the intention is to measure the component loading, component integrity and component properties along the fiber by means of light interferometry before and/or during the use of the component.

In a preferred embodiment of the invention, a fiber selected from the group consisting of glass fibers, aramid fibers, basalt fibers, carbon fibers and mixtures thereof can be used. In a particularly preferred embodiment of the invention, the fibrous fillers used are glass fibers and/or carbon fibers, especially glass fibers.

Further preferably, the fiber can be selected from the group of glass, polyester, polyurethane, or polyamide fibers, and mixtures of these.

In a further preferred embodiment, fibers according to the invention of different material classes can be used alongside one another.

In a further particular embodiment, fibers according to the invention having a length of ≥3 cm and fibers not according to the invention having a length of ≤3 cm can be used alongside one another.

According to the invention, fibers of all material classes and lengths can be used alongside one another, provided that at least the sum total of fibers according to the invention having a fiber length of ≥3 cm exceeds a proportion by weight of 1.5% and the object according to the invention has the claimed anisotropic properties with respect to the modulus.

Additionally preferably for the product, the difference in the refractive index ΔRI of the fibers and of the polymer can be less than or equal to 0.1 and the polymer can be a transparent polymer having a light transmission measured in a UV-VIS spectrometer on a sample having a thickness of 1 mm in the wavelength range of 400-800 nm of ≥50%. The products according to the invention may advantageously also be distinguished by the fact that they are essentially transparent. This can be advantageous in the cases where "invisible" products, such as for example dental splints, are desirable. As a result of the match between fiber material and polymer, the products obtainable are highly transparent and cannot be seen in use.

According to a further embodiment, the ratio between the length of the product axis having the greatest extent and the average of the fiber length is in a range from ≥0.5:1 to ≤10:1. This ratio is preferably ≥0.9:1 to ≤10:1 and more preferably ≥1:1 to ≤10:1. The longer the fibers relative to the product, the higher the expected tensile modulus in the fiber direction. Fiber lengths greater than the product itself can be achieved by depositing continuous fibers from an FDM (FFF) printhead, for example during the additive manufacture of O-rings or toothed belts.

The product according to the invention can be produced by, in a FFF process at a temperature of >60° C., simultaneously, successively or alternately depositing a thermoplastic polymer and one or more fibers having a length of greater than or equal to 3 cm to form a product. This method has proven useful for the construction of 3D-printed products having strongly anisotropic mechanical properties. The method does not in this case have to be used to construct the entire fiber-reinforced product. It is sufficient for merely a portion of the product to be obtained via the abovementioned method. This can be done, for example, by modifying an existing component by depositing a fiber-reinforced layer on this component during and after an additive manufacturing process. FFF is a melt-layering process. The term "melt-layering process" refers to a manufacturing process from the field of additive manufacturing, with which a workpiece is formed layer-by-layer, for example from a meltable plastic. The plastic can be used with or without further additions such as fibers. Machines for FFF belong to the machine class of 3D printers. This method is based on the liquefaction of a plastic or wax material in wire form by heating. The material is finally cooled, whereupon it solidifies. The material is applied via extrusion, using a heated nozzle which is freely movable in relation to a manufacturing plane. It is possible here either for the manufacturing plane to be fixed and for the nozzle to be freely movable or for a nozzle to be fixed and a substrate table (with a manufacturing plane) to be movable, or for both elements, the nozzle and manufacturing plane, to be movable. The speed at which substrate and nozzle are movable with respect to one another is preferably within a range from 1 to 200 mm/s. The layer thickness is within a range from 0.025 and 1.25 mm depending on the application and the exit diameter of the material jet (nozzle outlet diameter) from the nozzle is typically at least 0.05 mm.

The individual layers in layer-by-layer model production therefore become joined to one another to give a complex component. Construction of a body is conventionally achieved by repeatedly tracing a working plane line by line (forming a layer) and then moving the working plane upward in a "stacking" manner (forming at least one further layer on the first layer) so as to produce a shape layer-by-layer. The exit temperature of the mixtures of material from the nozzle may for example be 80° C. to 420° C. It is additionally possible to heat the substrate table and/or the build chamber, for example to 20° C. to 250° C. This can prevent excessively fast cooling of the applied layer so that a further layer applied thereupon is sufficiently joined to the first layer.

According to a further embodiment, the product is a seal, a membrane, a drive belt, a pressure hose, an orthopedic prosthesis, an orthopedic aid or a dental aligner.

The products according to the invention are particularly advantageously suitable for applications involving asymmetric loading scenarios, where the products have to have either good tough-elastic properties or reversible dynamic deformability in at least one spatial direction over many cycles while simultaneously having high dimensional constancy in at least one spatial direction preferably orthogonal thereto. Preferred applications are for example seals which seal under compression but are intended to have a high deformation resistance perpendicular to the compression force (in order to prevent gap extrusion of the seal in the case of seals in the high-pressure region), but at the same time need to have a high level of mounting flexibility. Typical examples of these are sealing rings (O-rings, groove rings, flange seals, gaskets and other products having sealing functions).

Further preferred applications are drive belts of any format which have to exhibit high dynamic flexibility perpendicular to the fiber direction but in the fiber direction are intended to be as longitudinally stable as possible. Typical examples include, for example, drive belts, toothed belts, V-belts, drive belts, square section belts, flat belts, automatic clutch belts, conveyor belts, as are frequently used in transport and force transmission applications.

Further preferred applications are dental aligners, which have to exhibit high flexibility and toughness perpendicular to the fiber direction in order to be able to be reliably fitted and removed, but are to be as dimensionally stable as possible in the fiber direction, or tooth correction direction.

Further preferred applications are orthopedic support elements, which perpendicular to the fiber direction have to exhibit a high level of flexibility, but in the fiber direction are to be as longitudinally stable as possible: typical examples include corsets, support bandages, prostheses or shoe soles.

Further preferred embodiments are pressure hoses, which perpendicular to the fiber direction have to exhibit a high level of flexibility, but in the fiber direction are to be as longitudinally stable as possible: typical examples include common pneumatic hoses and air springs. In this case and in other cases involving a load direction perpendicular to the main extension axis or symmetry axis of the component, it is frequently advantageous if the fiber plies intersect, preferably at an angle of 25° to 65°, with a preferred reinforcement being obtained radially to the symmetry axis. This embodiment can to a large extent retain the mobility and elasticity in the symmetry axis.

Figure 2:
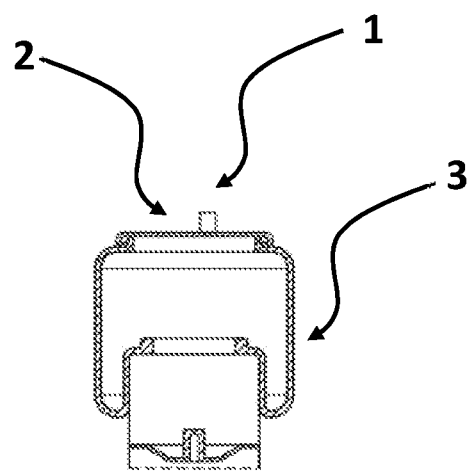
FIG. 2 shows a possible product in the context of the invention. An air spring produced via 3D printing according to the invention is illustrated in a cross-sectional illustration.
Figure 3:
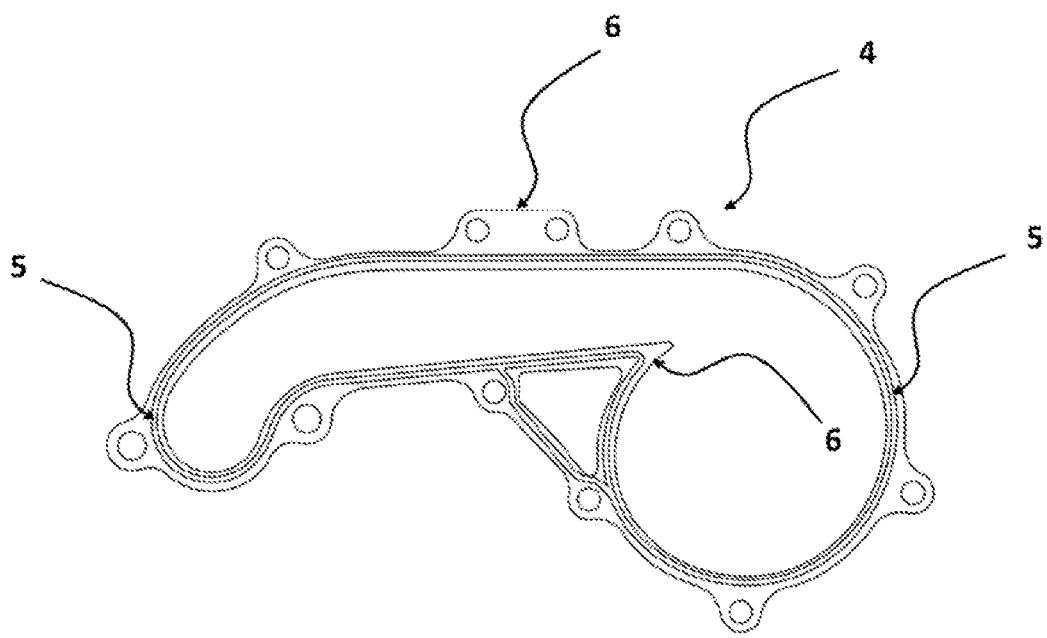
FIG. 3 shows a possible product in the context of the invention. A sealing element produced via 3D printing according to the invention and having an embedded continuous fiber is illustrated.
Figure 4:
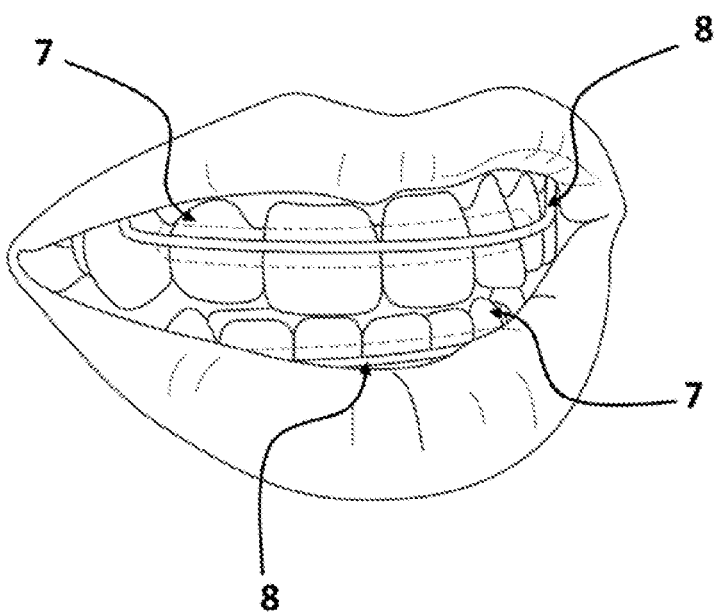
FIG. 4 shows a possible product in the context of the invention. An orthopedic dental splint produced via 3D printing according to the invention and having a visible fiber reinforcement is illustrated.
Figure 5:
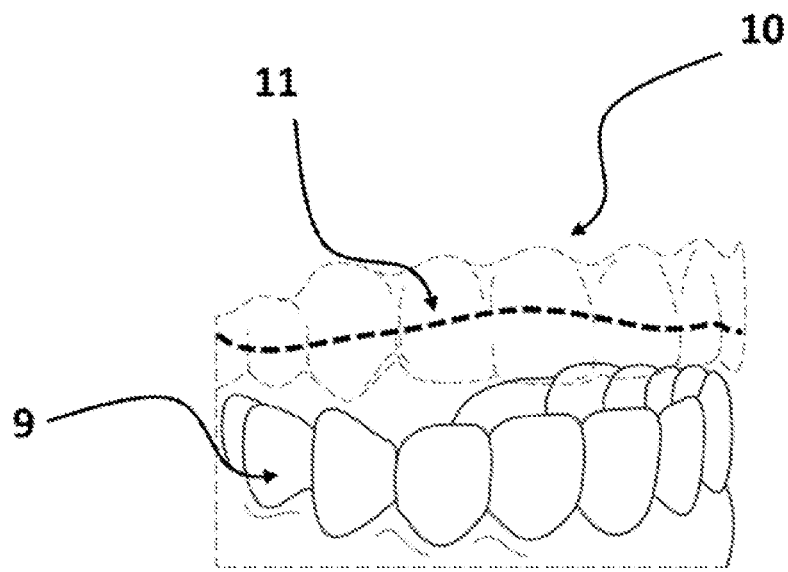
FIG. 5 shows a possible product in the context of the invention. A transparent orthopedic dental splint produced via 3D printing according to the invention and having a visually adapted fiber reinforcement is illustrated.
Figure 6:
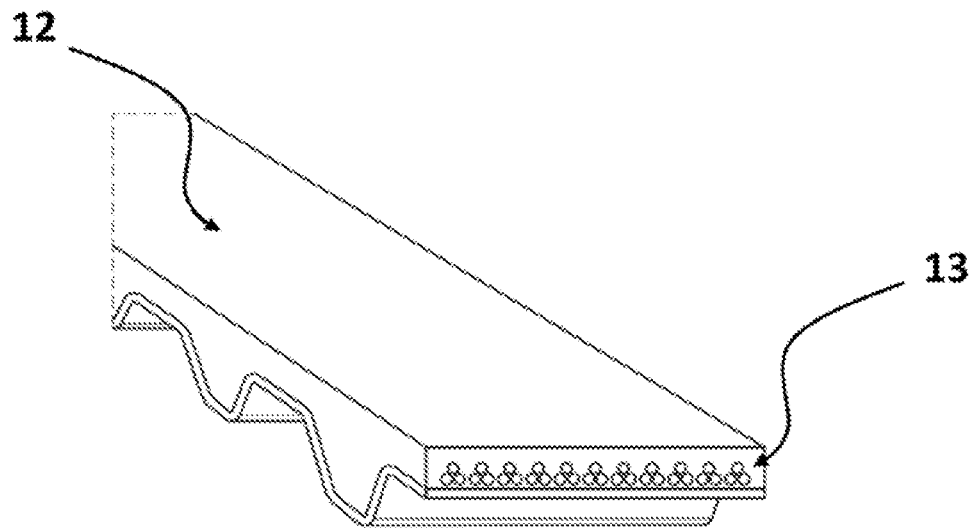
FIG. 6 shows a possible product in the context of the invention. A section through a toothed belt 3D-printed in accordance with the invention and having an integrated fiber reinforcement is illustrated.

Further advantages and advantageous configurations of the objects of the invention are illustrated by the drawings and elucidated in the description that follows. It should be noted that the drawings are merely of a descriptive nature and are not intended to limit the invention. In the figures:

FIG. 1 shows a possible product in the context of the invention. An air spring produced via 3D printing according to the invention is illustrated in a top view;

FIG. 2 shows a possible product in the context of the invention. An air spring produced via 3D printing according to the invention is illustrated in a cross-sectional illustration;

FIG. 3 shows a possible product in the context of the invention. A sealing element produced via 3D printing according to the invention and having an embedded continuous fiber is illustrated;

FIG. 4 shows a possible product in the context of the invention. An orthopedic dental splint produced via 3D printing according to the invention and having a visible fiber reinforcement is illustrated;

FIG. 5 shows a possible product in the context of the invention. A transparent orthopedic dental splint produced via 3D printing according to the invention and having a visually adapted fiber reinforcement is illustrated;

FIG. 6 shows a possible product in the context of the invention. A section through a toothed belt 3D-printed in accordance with the invention and having an integrated fiber reinforcement is illustrated;

FIG. 7 shows a possible configuration for the deposition in accordance with the invention of a fiber in the method according to the invention.

FIGS. 1 and 2 show air springs (1) 3D-printed according to the invention, where in particular the diaphragm (3) of the air springs (1) has been produced via 3D printing and comprises fibers embedded in an elastomer, for example a thermoplastic elastomer. The air spring is a combination of parts (2) not produced via 3D printing and the 3D-printed diaphragm (3). These fibers can be incorporated into the diaphragm (3) either in one direction or crosswise in the form of a woven fabric or non-crimp fabric. The fibers thus run within the diaphragm and would "look out" at the cut edge in the sectional drawing. The spring (1) can be inflated from the inside and in this way raises itself, changing the volume without significantly changing the enveloping surface (diaphragm). The diaphragm (1) is therefore only insignificantly stretched, if at all. The high mechanical strength and the high elasticity result here on account of the anisotropic mechanical properties of the material having the embedded fibers. There is therefore a high mechanical strength in the circumference of the diaphragm (3) (which results in a high pressure resistance), where it is rather the elastic properties which predominate with respect to the materials (2) not according to the invention. The spring can optionally also be produced in its entirety by means of a 3D printing process. The diaphragm (3) of the air spring (1) can for example be constructed from a combination of a thermoplastic elastomer with embedded polyamide fibers. However, it is also possible for this construction to use polychloroprene rubber and polyamide fibers or thermoplastic polyurethanes and polyaramid fibers.

FIG. 3 shows a 3D-printed sealing element (4) having non-fiber-reinforced regions (6) and a continuous fiber (5) embedded therein. The continuous fiber (5) is completely embedded in the sealing element, which for example consists of an elastomer. Due to the fiber embedding (5), high mechanical strengths with only minor extension of the sealing element result in the load direction in the later use. In a direction perpendicular thereto, the sealing element is however markedly elastic, meaning that there is good embedding into the surfaces to be sealed. This can increase the service life of the sealing element and enables reliable operation under "more unfavorable" environmental conditions. The sealing element can for example consist of or comprise 3D-printed thermoplastic polyurethanes with embedded polyaramid fibers.

FIG. 4 shows an orthopedic dental splint (7) which has been 3D-printed according to the invention and has fiber material (8) embedded in an elastomer. The fibers (8) are embedded in the load direction of the use and thus enable a reproducible and high pressure on the teeth for the correction of the tooth positions. Perpendicular to the fiber/loading direction, the dental splint (7) is extremely elastic due to the structure according to the invention, so that a simple insertion of the dental splint (7) is guaranteed. This can increase the comfort for the user. The dental splint can for example be constructed from TPU with embedded glass fibers or else from thermoplastic silicone with glass fibers embedded therein.

FIG. 5 likewise shows an orthopedic dental splint (10) which has been 3D-printed according to the invention and is formed from an elastomer with embedded fiber material (11), where, based on the optical properties of the fiber material and the optical properties of the polymer, an optical match can result which means that the fiber material is invisibly embedded in the polymeric material. The dental splint can be positioned easily on the dentition (9) due to the elastic properties of the material. This configuration can contribute to the dental splint being less visible and being worn more frequently by the user.

FIG. 6 shows a schematic section through a toothed belt (12) which has been 3D-printed according to the invention and is formed from an elastomer. Fibers (13) which markedly increase the mechanical durability of the toothed belt are embedded within the toothed belt perpendicular to the symmetry axis of the toothed belt (12), that is to say perpendicular to the normal vector of the contact surface. Perpendicular to the symmetry axis of the fibers (13), that is to say toward the outer sides of the toothed belt (12), the toothed belt (12) has markedly elastic properties which can increase the longevity of the material. Possible material combinations for this application would be for example TPU with embedded carbon fibers or else hydrogenated nitrile rubber/carbon fibers.

FIG. 7 schematically shows a possible set-up for carrying out the method according to the invention. It is shown that a fiber material (18) is deposited from a reservoir (15) between two layers of molten elastomer (17, 19). This diagram shows that the molten elastomer (17, 19) comes from two different stores (14, 16). However, it is also possible that only one nozzle deposits the elastomer (17, 19) and the embedding of the fiber material (18) is effected by repeated application from just one of the nozzles (14, 16).

The invention claimed is:

1. A fiber-reinforced, 3D-printed elastic product, comprising
    a proportion by weight of ≥50% of a polymer having a number average molecular weight of ≥5000 g/mol, as measured by means of gel permeation chromatography, and
    a proportion by weight of ≥0.5% and ≤20% of one or more fibers, the one or more fibers being a continuous fiber having an aspect ratio of ≥100 and a length of ≥10 cm and ≤1000 cm,
    wherein the polymer comprises a thermoplastic elastomer,
    wherein the product is at least partially produced by means of a Fused Filament Fabrication process,
    wherein the product, in a region of fiber reinforcement and in a direction of a fiber symmetry axis, has a tensile modulus of ≥1.5 GPa as measured according to DIN EN ISO 527-1,
    wherein the product, in the region of fiber reinforcement and perpendicular to the fiber symmetry axis, has a tensile modulus of ≤1.2 GPa as measured according to DIN EN ISO 527-1,
    wherein the product, in the region of fiber reinforcement and perpendicular to the fiber symmetry axis, has a yield point of >5% as measured according to DIN EN ISO 527-1, and
    wherein the thermoplastic elastomer is selected from the group consisting of thermoplastic copolyamides (TPA), thermoplastic copolyesters (TPC), olefin-based thermoplastic elastomers (TPO), styrene block copolymers (TPS), urethane-based thermoplastic elastomers (TPU), crosslinked olefin-based thermoplastic elastomers (TPV), polyvinyl chloride (PVC)-based thermoplastic elastomers, silicone-based thermoplastic elastomers, or a combination of at least two of these thermoplastic elastomers.

2. The product as claimed in claim 1, wherein the product is rotationally symmetrical in at least one three-dimensional section and the fiber symmetry axis is aligned perpendicular to a product symmetry axis.

3. The product as claimed in claim 1, wherein the product has an aspect ratio of ≥1 and the fiber symmetry axis lies essentially in a plane with a greatest product axis.

4. The product as claimed in claim 1, wherein the product, in the region of fiber reinforcement, has a loss factor tan δ of ≤0.07 as measured by means of dynamic mechanical analysis in tensile loading, and a yield point in the direction of the fiber symmetry axis of <7% as measured according to DIN EN ISO 527-1.

5. The product as claimed in claim 1, wherein the fibers comprise glass, carbon, basalt, polyester, polyethylene, polyurethane, polyamide, polyaramid, metal, or cellulose fibers, or mixtures of these.

6. The product as claimed in claim 1, wherein a difference in the refractive index of the fibers and of the polymer is less than or equal to 0.1 and the polymer is a transparent polymer having a light transmission measured in a UV-VIS spectrometer on a sample having a thickness of 1 mm in a wavelength range of 400-800 nm of >50%.

7. The product as claimed in claim 1, wherein a ratio between a length of a greatest product axis and an average of a fiber length is ≥0.5:1 to ≤10:1.

8. The product as claimed in claim 1, wherein the product is a seal, a membrane, a drive belt, a pressure hose, an orthopedic prosthesis, an orthopedic aid, or a dental aligner.

9. The product as claimed in claim 1, wherein the thermoplastic elastomer has a melting range of ≥20° C. to ≤280° C., as determined by differential scanning calorimetry, second heating at a heating rate of 20 K/min.

10. The product as claimed in claim 1, wherein the thermoplastic elastomer has a Shore A hardness according to DIN ISO 7619-1 of ≥40 to ≤98.

11. The product as claimed in claim 1, wherein the thermoplastic elastomer has a melt volume rate according to ISO 1133 of ≥5 to ≤200, measured 120° C. above the melting point, 10 kg.

12. The product as claimed in claim 1, wherein the thermoplastic elastomer comprises a thermoplastic polyurethane elastomer.

13. The product as claimed in claim 12, wherein the thermoplastic polyurethane elastomer is obtained from the reaction of the following components:
    a) at least one organic diisocyanate;
    b) at least one compound having groups reactive toward isocyanate groups and having a number-average molecular weight of ≥500 g/mol to ≤6000 g/mol and a number-average functionality of the sum total of the components b) of ≥1.8 to ≤2.5; and
    c) at least one chain extender having a molecular weight of 60-450 g/mol and a number-average functionality of the sum total of the chain extenders c) of 1.8 to 2.5.

14. The product as claimed in claim 12, wherein the thermoplastic polyurethane elastomer is obtained from the reaction of a polyisocyanate component and a polyol component, wherein the polyol component comprises a polyester polyol having a no-flow point (ASTM D5985) of ≥25° C.

15. The product as claimed in claim 1, wherein the one or more fibers have the length less than 100 cm.

* * * * *